(12) United States Patent
Hosaka

(10) Patent No.: US 6,326,578 B1
(45) Date of Patent: Dec. 4, 2001

(54) APPARATUS FOR APPLYING TENSION TO A WIRE ELECTRODE

(75) Inventor: Akio Hosaka, Fukui (JP)

(73) Assignee: Sodick Co., Ltd., Yokohama (JP)

( * ) Notice: Subject to any disclaimer, the term of this patent is extended or adjusted under 35 U.S.C. 154(b) by 0 days.

(21) Appl. No.: 09/514,848

(22) Filed: Feb. 28, 2000

(30) Foreign Application Priority Data

Feb. 26, 1999 (JP) .................................................. 11-050362

(51) Int. Cl.⁷ ...................................................... B23H 7/10
(52) U.S. Cl. ..................................... 219/69.12; 242/419.9
(58) Field of Search ........................... 219/69.12; 242/416, 242/419.9

(56) References Cited

U.S. PATENT DOCUMENTS

| | | | |
|---|---|---|---|
| 5,268,551 | * 12/1993 | Kawanabe et al. | 219/69.12 |
| 5,422,454 | 6/1995 | Kajitori | 219/69.12 |

FOREIGN PATENT DOCUMENTS

| | | | |
|---|---|---|---|
| 2-100829 | * 4/1990 | (JP) | 219/69.12 |
| 2-205415 | * 8/1990 | (JP) | 219/69.12 |
| 3-239422 | * 10/1991 | (JP) | 219/69.12 |
| 8-336 | 1/1996 | (JP) . | |
| 2686783 | 8/1997 | (JP) . | |

* cited by examiner

*Primary Examiner*—Geoffrey S. Evans
(74) *Attorney, Agent, or Firm*—McDermott, Will & Emery; Paul Devinsky

(57) ABSTRACT

A device applying device for applying tension to a traveling wire electrode including a controllable torque brake (11), a rotatable tension roller (2) around which a wire electrode (6) is wound, and a drive roller (4) directly linked to the brake means and pressed against the peripheral surface of the tension roller, and having a diameter smaller than the diameter of the tension roller. An alternative tension applying device includes a brake (11), a rotatable tension roller (2), an intermediate roller (12) having substantially the same diameter as the tension roller and formed integrally with the tension roller, and a drive roller (4) directly linked to the brake and pressed against the peripheral surface of the intermediate roller, and having a diameter smaller than the diameter of the tension roller.

10 Claims, 7 Drawing Sheets

APPARATUS FOR APPLYING TENSION TO A WIRE ELECTRODE

FIELD OF THE INVENTION

The present invention relates to a wire electric discharge machine for machining a conductive workpiece by causing electric discharge between a traveling wire electrode and the conductive workpiece, and more particularly to a tension applying device for applying tension to the traveling wire electrode.

BACKGROUND OF THE INVENTION

A wire electrode is normally supplied to a workpiece from a wire bobbin, running along a fixed wire conveying path including a tension applying device, to take-up rollers from which used wire electrode is discharged to an appropriate bucket. If a voltage pulse is applied between the wire electrode and the workpiece, electric discharge is caused between the wire electrode, as it is held in tension while traveling between a pair of wire guides and the workpiece. A wire electric discharge machine causes the wire electrode and the workpiece to move relative to each other within a horizontal X-Y plane in order to form the workpiece into a desired profile. The speed of travel of the wire electrode is controlled by a motor causing rotation of the take-up rollers, and tension on the wire electrode is provided by the tension applying device. In many instances, a wire electrode having a diameter of about 0.20 to 0.35 mm is used, but sometimes, a fine wire, having a diameter of about 0.15 to 0.05 mm, is used. The tension applying device adjusts the tension according to the diameter of the wire electrode. For example, a tension of about 1200 g may be applied to a wire electrode having a diameter of 0.20 mm, and a tension of about 50 g may be applied to a wire electrode having a diameter of 0.03 mm. In order to improve surface roughness and dimensional accuracy, a tension applying device has been proposed in order to accurately apply the appropriate tension according to the diameter to the wire electrode, and to prevent variations in tension.

Japanese Patent 8-336 discloses a tension applying device provided with a brake roller 47 linked to a high torque electromagnetic brake 3 via a clutch 7, and a pinch roller 46 which contact(s) a peripheral surface of the brake roller 47 and which is linked to a low torque electromagnetic brake 1, as shown in FIG. 10. A wire electrode 6 is wound in an S-shape around the rollers 46 and 47. When a relatively thick wire electrode 6 is used, the relatively large braking torque of the high torque electromagnetic brake 3 is transmitted to the brake roller 47. On the other hand, when a fine wire electrode 6 is used, the clutch 7 is disengaged and only the relatively small braking torque of the low torque electromagnetic brake 1 is transmitted to the pinch roller 46.

As shown in FIG. 11, Japanese Patent No. 2686783 discloses a tension applying device having a switch 8 for connecting a brake roller 47 to a large brake 3 when a relatively thick wire electrode 6 is used, and for connecting the brake roller 47 a small brake 1 when a thin wire electrode 6 is used. A similar device is also disclosed in U.S. Pat. No. 5,422,454.

SUMMARY OF THE INVENTION

An object of the present invention is to provide a tension applying device capable of accurately applying appropriate tension to a wire electrode according to the diameter, and provided with only one brake means.

Additional objects, advantages and novel features of the invention will be set forth in the description that follows, and in part will become apparent to those skilled in the art upon reading this description or practicing the invention. The objects and advantages of the invention may be realized and attained by practicing the invention as recited in the appended claims.

In order to achieve the foregoing and other objects, a first embodiment of tension applying device for a wire electric discharge machine according to the present invention may comprise brake means having controllable torque, a rotatable tension roller around which a wire electrode is wound, and a drive roller directly linked to the brake means and pressed against the peripheral surface of the tension roller, the drive roller having a diameter smaller than the diameter of the tension roller.

Another embodiment of tension applying device for a wire electrode discharge machine according to the present invention may comprise a brake means having controllable torque, a rotating tension roller around which a wire electrode is wound, an intermediate roller having substantially the same diameter as the tension roller and formed integrally with the tension roller, and a drive roller directly linked to the brake means and pressed against the peripheral surface of the intermediate roller, the drive roller having a diameter smaller than the diameter of the tension roller.

BRIEF DESCRIPTION OF THE FIGURES

The accompanying drawings, which are incorporated in, and form a part of the specification, illustrate embodiments of the present invention and, together with the description, serve to explain the principles of the invention.

PREFERRED EMBODIMENT OF THE INVENTION

Figure 1:
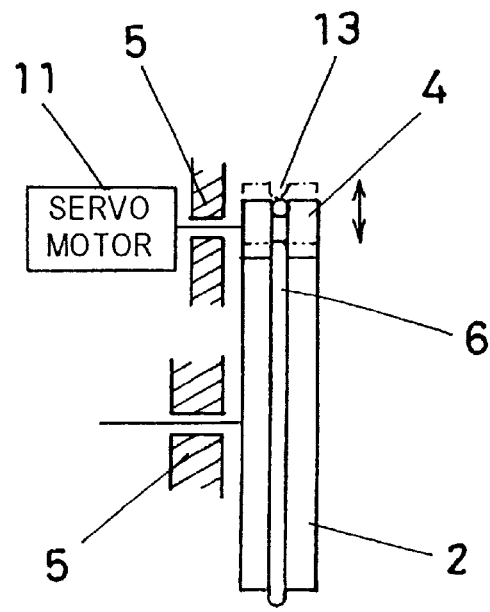
FIG. 1 is a schematic drawing illustrating a first embodiment of a tension applying device according to the present invention.

A first embodiment of a tension applying device of the present invention will now be briefly described with reference to FIG. 1.

A rotatable tension roller 2, having a wire electrode 6 wound around its peripheral surface, and a drive roller 4 pressed against the peripheral surface thereof, the drive roller 4 having a diameter of only about one fifth that of the tension roller 2, are provided in a machine casing panel 5. A material having large frictional resistance is adhered to the peripheral surface of the tension roller 2 so that the wire electrode 6 and the drive roller 4 do not slip. The drive roller 4 has a groove 13 into which the wire electrode 6 fits, and the rotational axis of the drive roller 4 is coupled to an output shaft of a servo motor 11. The tension on the wire electrode 6 is controlled by varying the braking torque generated by the servo motor 11. Because the diameter of the drive roller 4 is smaller than that of the tension roller 2, the servo motor 11 can control rotation of the tension roller 2 using only the small torque produced by the ratio of the diameters between the tension roller 2 and the drive roller 4. Accordingly, the tension applying device does not require a large capacity motor. Since the servo motor 11 need only produce a relatively small torque, accurate control of the tension applied to the wire electrode may be realized. In addition, the moment of inertia of the drive roller 4 is much smaller than that of the tension roller 2. Therefore, the drive roller 4 is extremely responsive to variations in braking torque.

A second embodiment of a tension applying device of the present invention will now be briefly described with reference to FIG. 2.

Figure 2:
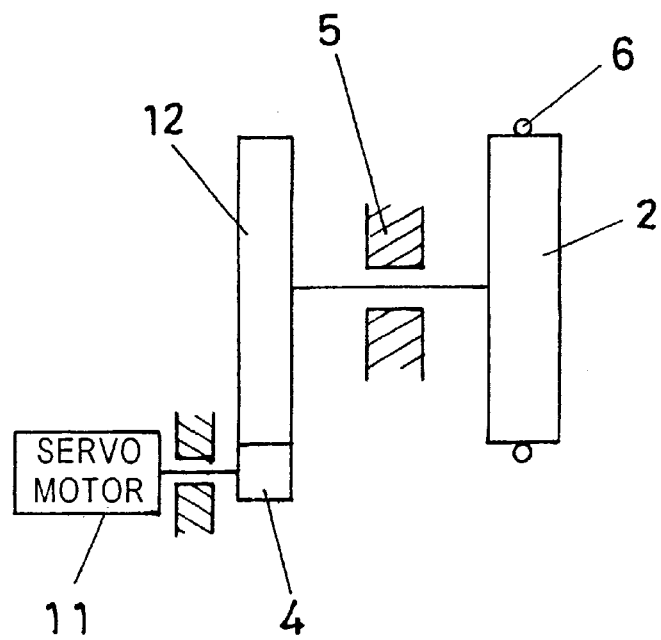
FIG. 2 is a schematic drawing illustrating a second embodiment of a tension applying device of the present invention.

Reference numerals that are the same as those used in FIG. 1 represent the same elements in FIG. 2, and description of these elements will be omitted.

An intermediate roller 12 having substantially the same diameter as that of a tension roller 2 is fixed to a rotational axis of the tension roller 2, for example, at a rear side of a machine casing panel 5. A drive roller 4 is pressed against the peripheral surface of the intermediate roller 12. In this embodiment, the front of the machine casing panel 5 is simple, and there is the advantage that no groove, such as the groove 13 illustrated in FIG. 1, is required in the peripheral surface of the drive roller 4.

The first embodiment of the tension applying device of the present invention will now be described in more detail with reference to FIG. 3, FIG. 4, FIG. 5, FIG. 6 and FIG. 7.

Figure 3:
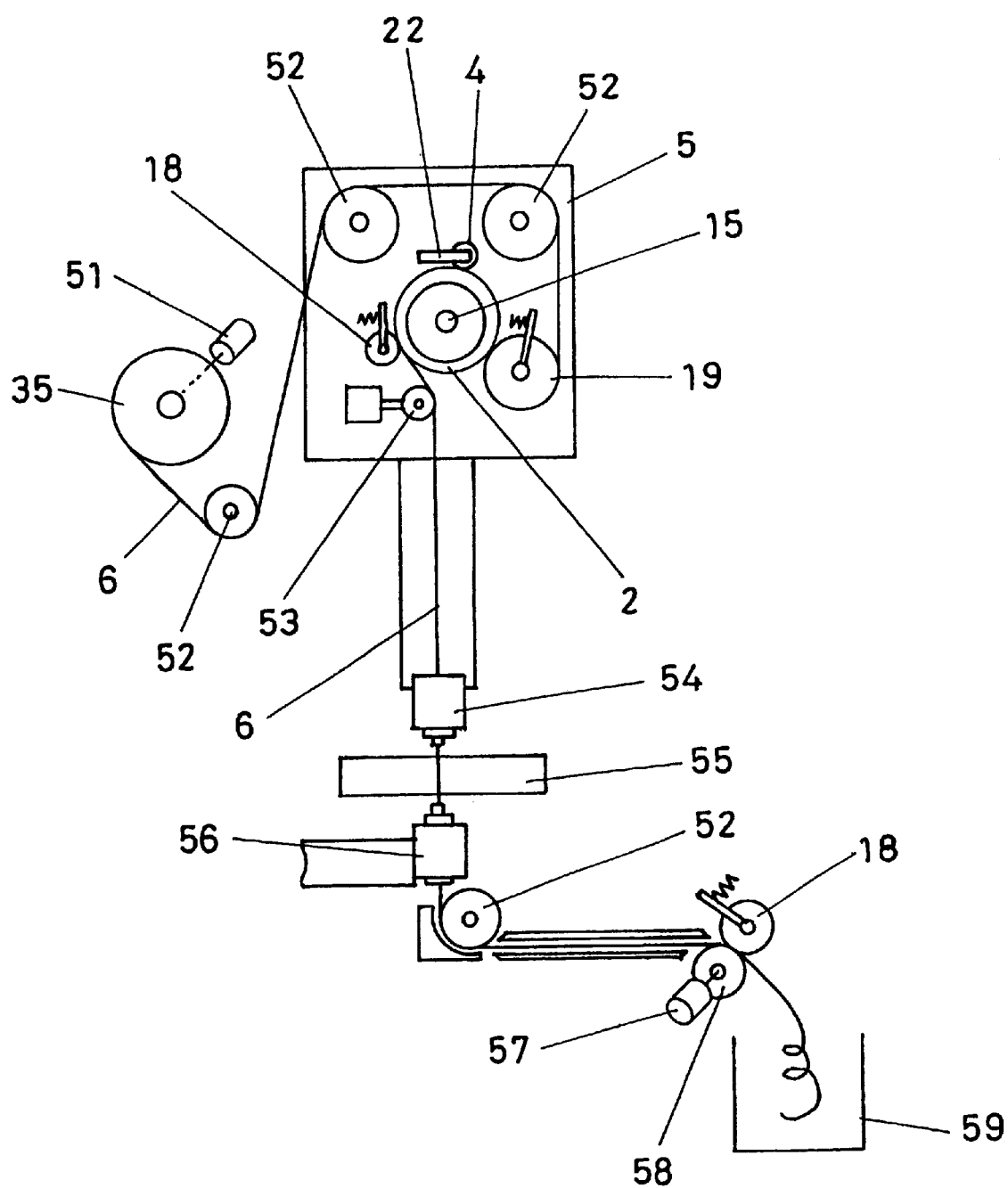
FIG. 3 is a front elevation illustrating an exemplary wire electric discharge machine using the tension applying device of FIG. 1.

As shown in FIG. 3, a wire electrode 6 of a wire electric discharge machine is fed from a wire bobbin 35 connected to a torque motor 51, around a number of direction changing rollers 52 and a pinch roller 19, to the tension roller 2. The torque motor 51 sets the tension of the wire electrode 6 between the wire bobbin 35 and the tension roller 2. As is clearly shown in FIG. 7, the wire electrode 6 is preferably wound in an S-shape around the pinch roller 19 and the tension roller 2. The large diameter pinch roller 19 and the small diameter pinch roller 18 are pressed against the tension roller 2 by respective springs or the like, and the wire electrode 6 is thus prevented from coming off of the tension roller 2. The drive roller 4 is positioned so that it can be connected to or separated from the tension roller 2. The wire electrode 6 is fed to a take-up roller 58 by way of a tension detecting roller 53, an upper wire guide 54, the workpiece 55, a lower wire guide 56 and a direction changing roller 52 and discharged to a bucket 59. The tension detecting roller 53 is supported on a beam, and deflection of the beam represents the tension on the wire electrode 6 as detected by a strain gauge. The detected value of the tension of the wire electrode 6 is fed back to the tension controller (not shown). The take-up roller 58 is connected to a motor 57 and the pinch roller 18 is pressed against the take-up roller 58 by a spring or the like.

Figure 4:
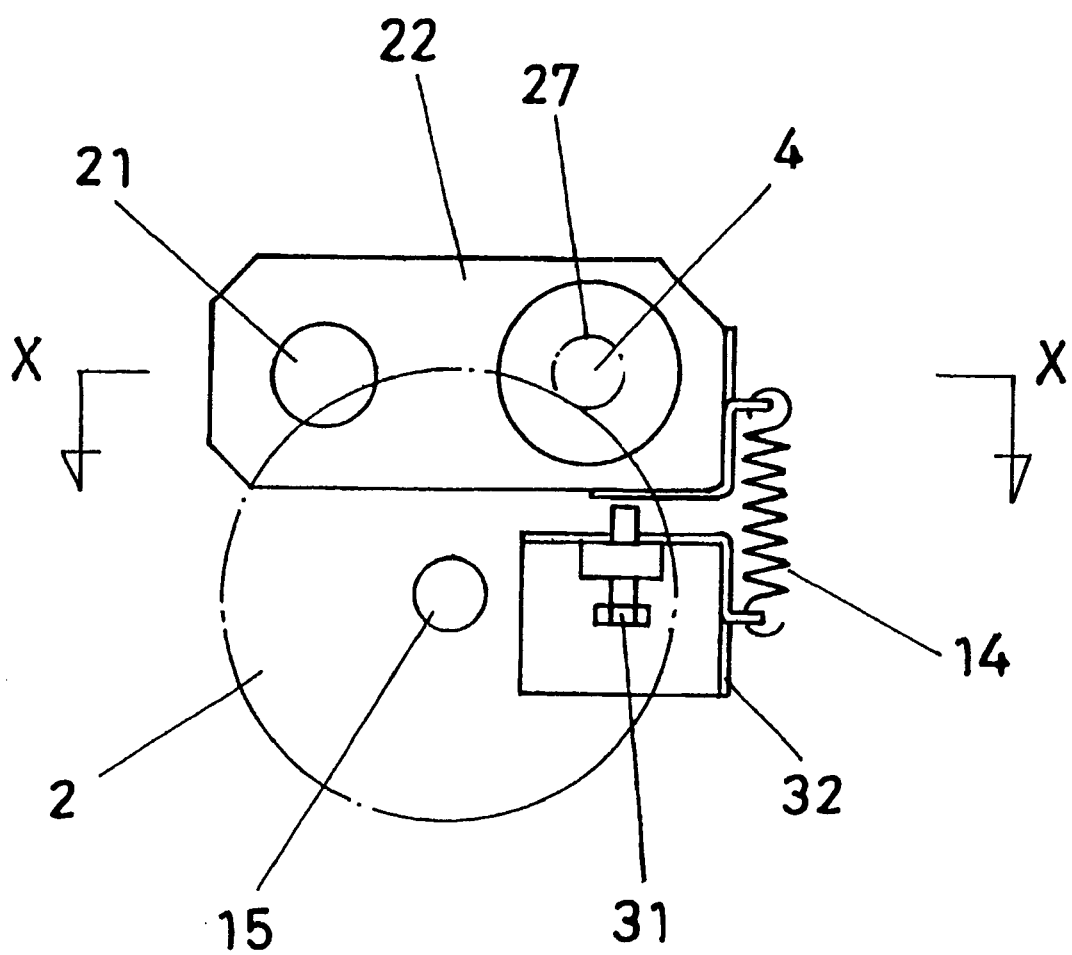
FIG. 4 is a front elevation illustrating the tension applying device of FIG. 1.
Figure 6:
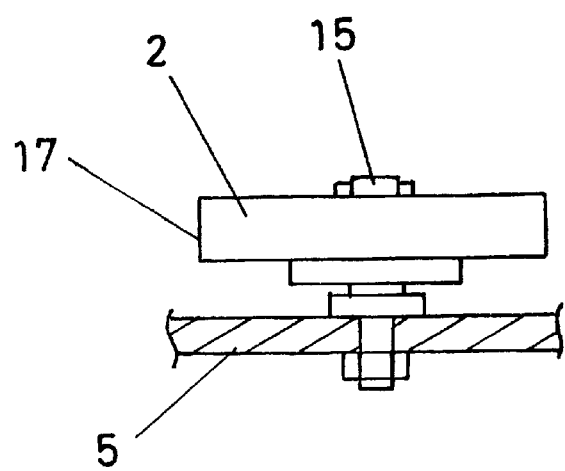
FIG. 6 is a plan view illustrating a tension roller of FIG. 1.
Figure 7:
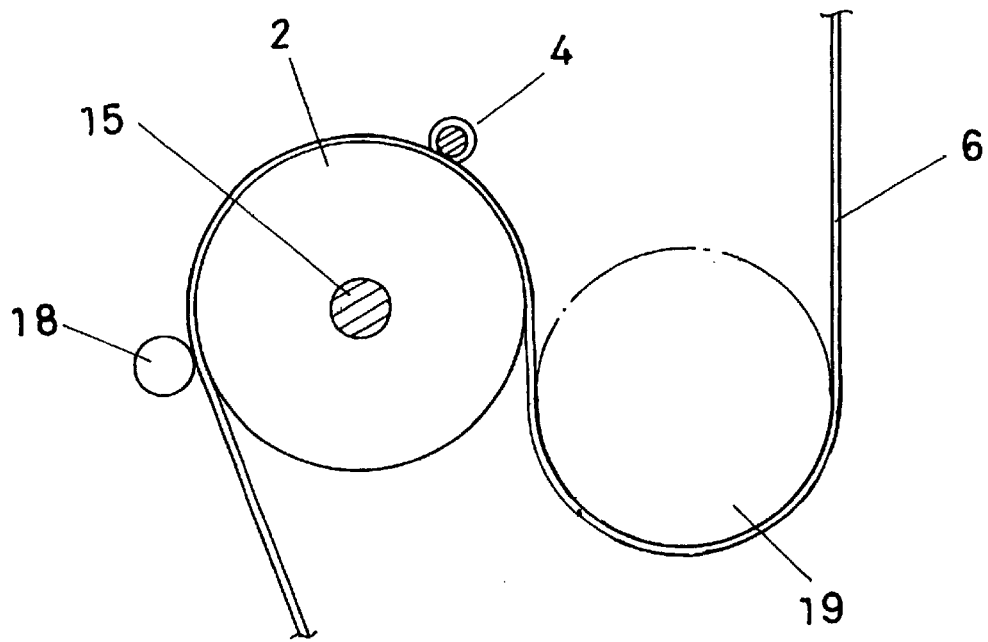
FIG. 7 is a cross sectional drawing taken along line Y—Y in FIG. 5, and further illustrates the tension applying device of FIG. 1.
Figure 9:
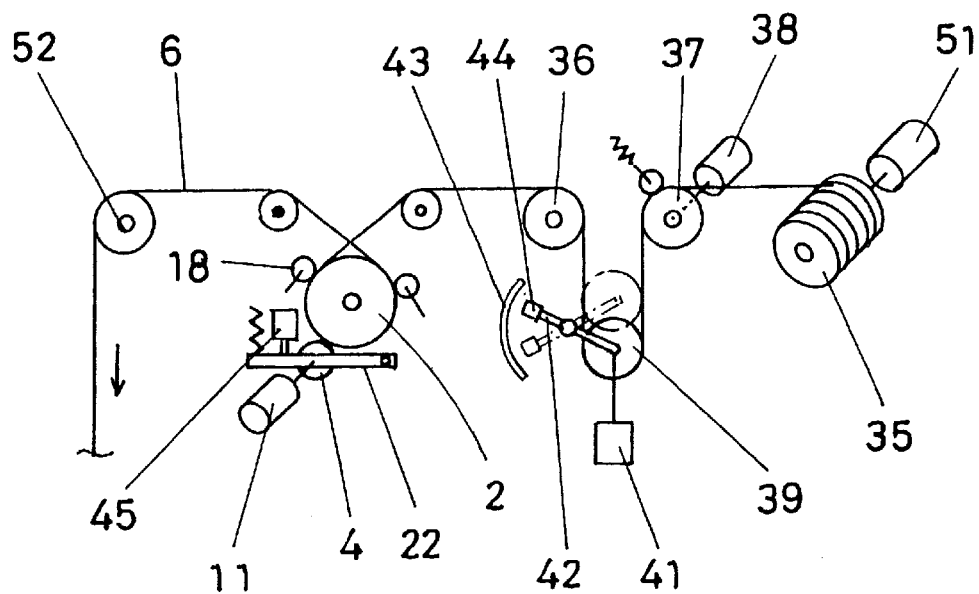
FIG. 9 is a front elevation illustrating an exemplary wire electric discharge machine which in addition to the tension applying device of the present invention is provided with a device for applying tension to an extremely fine wire electrode.
Figure 10:
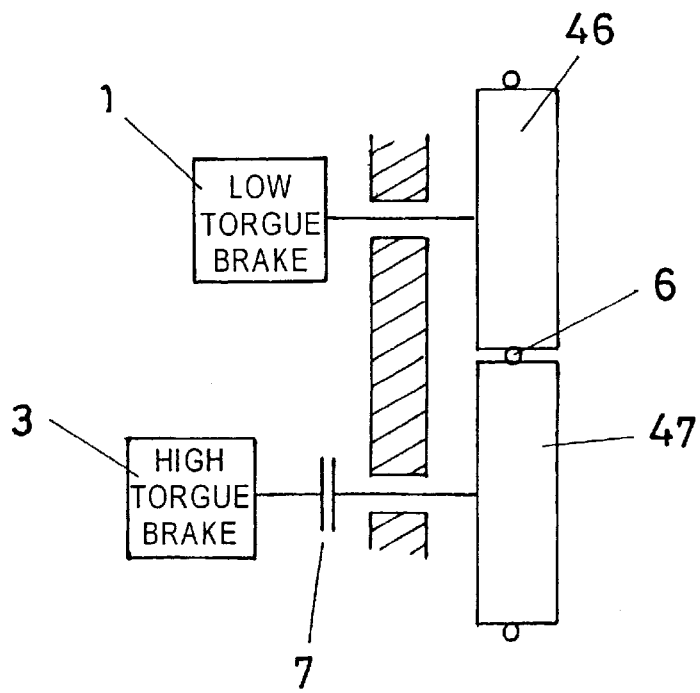
FIG. 10 illustrates a tension applying device of the related art.
Figure 11:
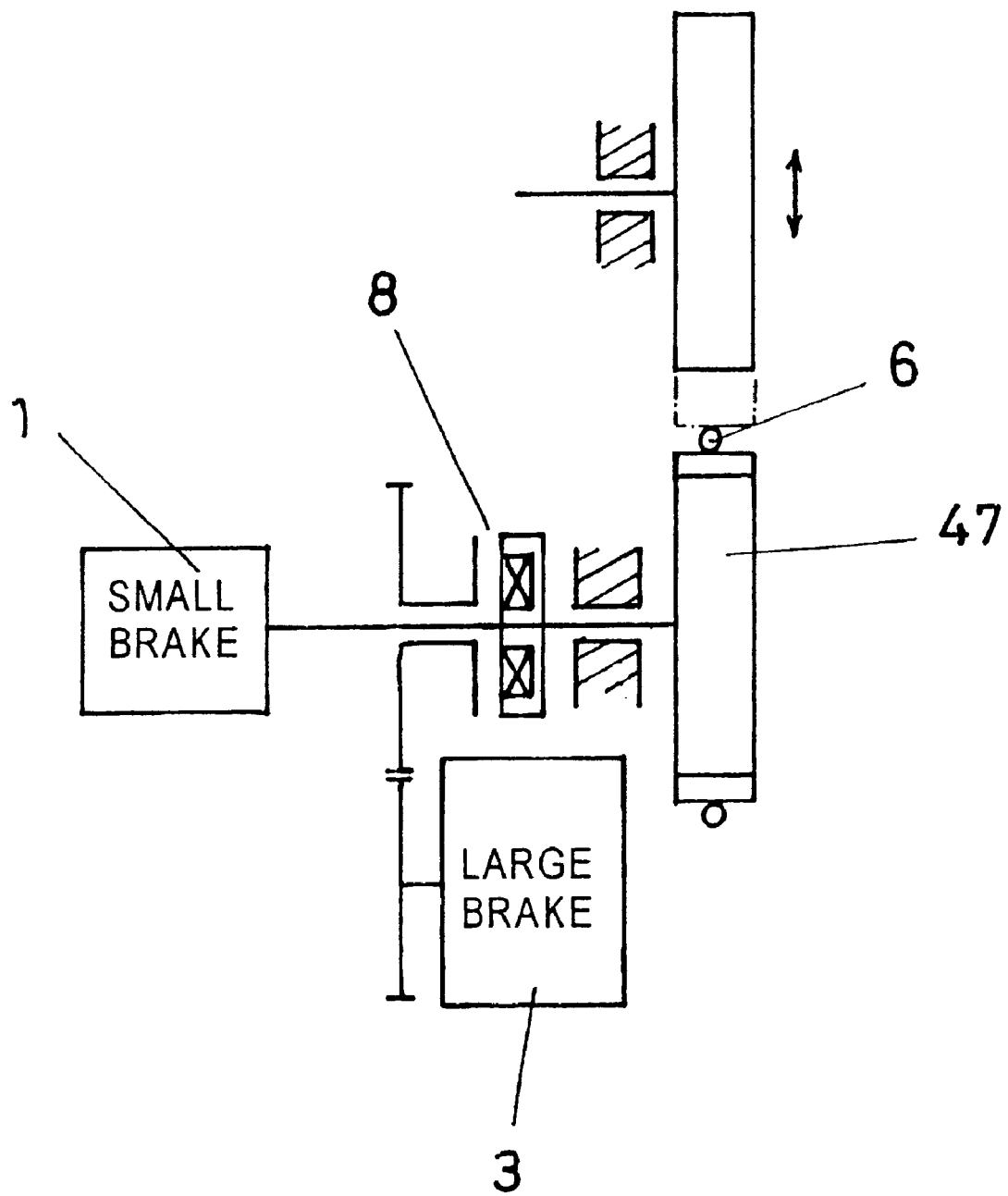
FIG. 11 illustrates a tension applying device of the related art.

As shown in FIG. 4, the tension applying device of the present invention includes the tension roller 2, and the drive roller 4 which is pressed against the peripheral surface of the tension roller 2 by a coil spring 14. A bracket 32 which threadingly engages, e.g., a machine bolt 31, is fixed to a rear surface of the machine casing panel 5. If the machine bolt 31 presses against a lever 22 rotatable around a pin 21, the drive roller 4 may be separated from the tension roller 2. Alternatively, similar movement of the drive roller 4 in this may be carried out using, i.e., a fluid pressure cylinder 45 of FIG. 9. As shown in FIG. 6, the tension roller 2 is rotatably supported by a suitable bearing on a shaft 15 protruding from the machine casing panel 5.

Figure 5:
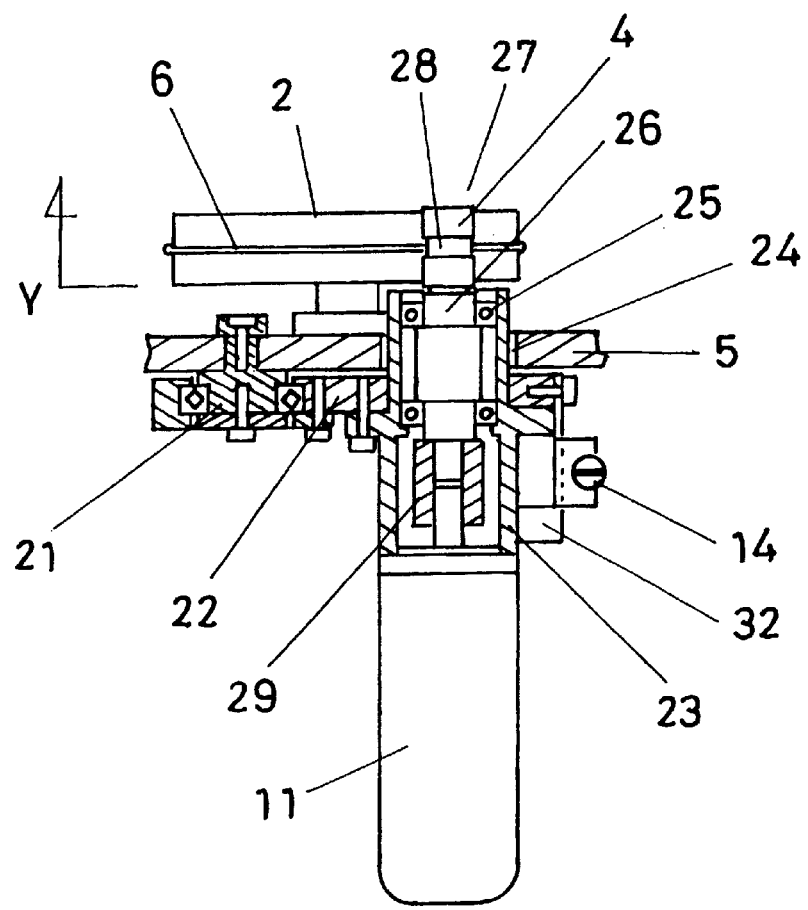
FIG. 5 is a cross sectional drawing taken along line X—X in FIG. 4, and illustrates the tension applying device of FIG. 1.

In order to prevent slippage of the wire electrode 6, urethane rubber 17 or the like may be affixed to the peripheral surface of the tension roller 2. A servo motor 11, which generates braking torque for the drive roller 4, is attached to the tip end of the lever 22 using a holder 23, as illustrated in FIG. 5. The holder 23 extends through a hole 24 in the machine case panel 5, and faces the drive roller 4. The holder 23 also has a bearing 25 for supporting a roller shaft 26 to which the drive roller 4 is attached at its end. An output shaft of the servo motor 11 and the roller shaft 26 are connected by a coupling 29. A groove 28 is formed in the outer surface of the drive roller 4 so that the drive roller 4 may avoid contact with the wire electrode 6 wound around the tension roller 2. In order to increase frictional force between the tension roller 2 and the drive roller 4, urethane rubber 27 is preferable affixed to the outer surface of the drive roller 4. If the servo motor 11 is directly connected to the tension roller 2, as in the typical construction, the servo motor 11 must normally rotate at about 30 rpm. In the present embodiment, since the drive roller 4 has a diameter that is only about one fifth that of the tension roller 2, the servo motor 11 needs to rotate at 150 rpm. If the servo motor 11 is an AC motor, this higher speed of rotation is advantageous in terms of control of the tension applied to the wire electrode 6.

Figure 8:
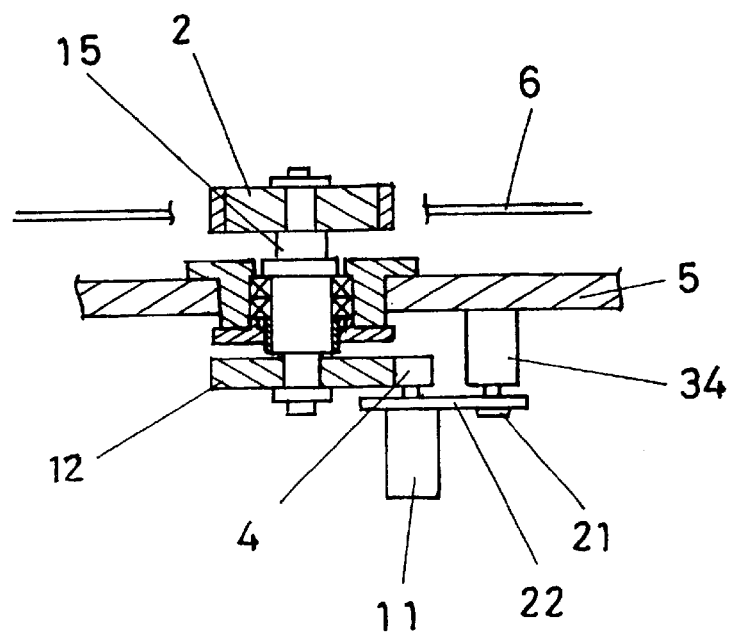
FIG. 8 is a cross sectional view illustrating the tension applying device of FIG. 2.

The second embodiment of the tension applying device of present invention will now be described in detail with reference to FIG. 8. Reference numerals that are the same as those used in FIG. 3, FIG. 4, FIG. 5, FIG. 6 and FIG. 7 represent the same elements, and description of those elements will be omitted.

A shaft 15 having a tension roller 2 fixed to one and an intermediate roller 12 fixed to the other end is rotatably supported in a machine casing panel 5. A drive roller 4 is separable from the intermediate roller 12 by operation of a lever 22. The drive roller 4 and a servo motor 11 have the same structure as in the tension applying device illustrated in FIG. 5, and are mounted on the tip end of the lever 22. The lever 22 is capable of rotation around a pin 21. The pin 21 is supported on a support block 34 provided on a rear surface of the machine case panel 5.

Two support rollers 36 and 37 are provided on a wire conveying path between a wire bobbin 35 and the tension roller 2. The upstream support roller 37 is connected to a motor 38, and a pinch roller is pressed against the peripheral surface of the support roller 37. A balancing roller 39 is suspended from the wire electrode 6 hanging in a U-shape from the support rollers 36 and 37, and can be moved in the vertical direction. A balance weight 41 for applying a slight tension to the wire electrode 6 is suspended from the balancing roller 39. For example, an approximately 100 g balance weight 41 will apply a tension of about 50 g on the wire electrode 6. A lever 42 is rotatably attached to the machine case panel 5. One end of the lever 42 is attached to a shaft of the balancing roller 39. A photoelectric sensor 44 is attached to the other end of the lever 42. The photoelectric sensor 44 may read, for example, pulse signals (digital signals) or density signals (analogue signals) from a scale 43 provided around the lever 42. Alternatively, a rotational angle of the lever 42 indicating the position of the balancing roller 39 may be detected by an encoder. The rotational speed of the motor 38 is controlled in response to the detected position of the balancing roller 39. If the balancing roller 39 rises too much, the rotational speed of the motor 38 is increased, while if the balancing roller 39 falls too much, the rotational speed of the motor 38 is decreased.

When an extremely fine wire electrode 6 is used, the drive roller 4 is preferably separated from the tension roller 2 by a hydraulic pressure cylinder 45, and the balancing roller 39 applies a slight tension to the wire electrode 6. When a wire electrode of diameter between about 0.05 to 0.35 mm is used, the drive roller 4 is pressed against the tension roller 2 by the hydraulic pressure cylinder 45.

The foregoing description of preferred embodiments of the invention have been presented for purposes of illustration and description. It is not intended to be exhaustive or to limit the invention to the precise form enclosed, and obviously many modifications and variations are possible in light of the above teaching. It is intended that the scope of the invention be defined by the claims appended hereto.

What is claimed is:

1. An apparatus for applying device for applying tension to a traveling wire electrode of a wire electric discharge machine, comprising:

a controllable torque brake;

a rotatable tension roller of a first diameter having a peripheral surface around which the wire electrode is adapted to be wound; and a drive roller of a second diameter directly linked to the controllable torque brake, said drive roller having a peripheral surface pressed against the peripheral surface of the tension roller, wherein said second diameter is smaller than said first diameter.

2. The apparatus according to claim 1 wherein said controllable torque brake comprises a servo motor.

3. The apparatus according to claim 1 where said first and second diameters have a ratio of approximately 5:1.

4. The apparatus according to claim 1 wherein the tension roller has a groove in said peripheral surface, said groove being sized to accommodate said wire electrode.

5. The apparatus according to claim 1 wherein the peripheral surface of said tension roller comprises a material having a large frictional resistance to prevent slippage.

6. An apparatus for applying tension to a traveling wire electrode of a wire electric discharge machine, comprising:

a controllable torque brake;

a rotatable tension roller of a first diameter having an axis of rotation and a peripheral surface around which the wire electrode is adapted to be wound;

an intermediate roller of a second diameter substantially the same as said first diameter, said intermediate roller being fixed to the same axis of rotation as said tension roller so as to be rotatable therewith and having a peripheral surface; and a drive roller of a third diameter directly linked to the controllable torque brake, said drive roller having a peripheral surface pressed against the peripheral surface of the intermediate roller, wherein said third diameter is smaller than said first diameter.

7. The apparatus according to claim 6 wherein said controllable torque brake comprises a servo motor.

8. The apparatus according to claim 6 wherein said first and third diameters have a ratio of approximately 5:1.

9. The apparatus according to claim 6 wherein the peripheral surface of said tension roller comprises a material having a large frictional resistance to slippage.

10. The apparatus according to claim 6 further comprising a machine casing having a front side and a back side wherein said tension roller is disposed at the front side of said casing and said intermediate roller and drive roller are disposed on the rear side of said casing, wherein the rotating axis to which said tension roller and intermediate roller are fixed passes through said casing.

* * * * *